UNITED STATES PATENT OFFICE.

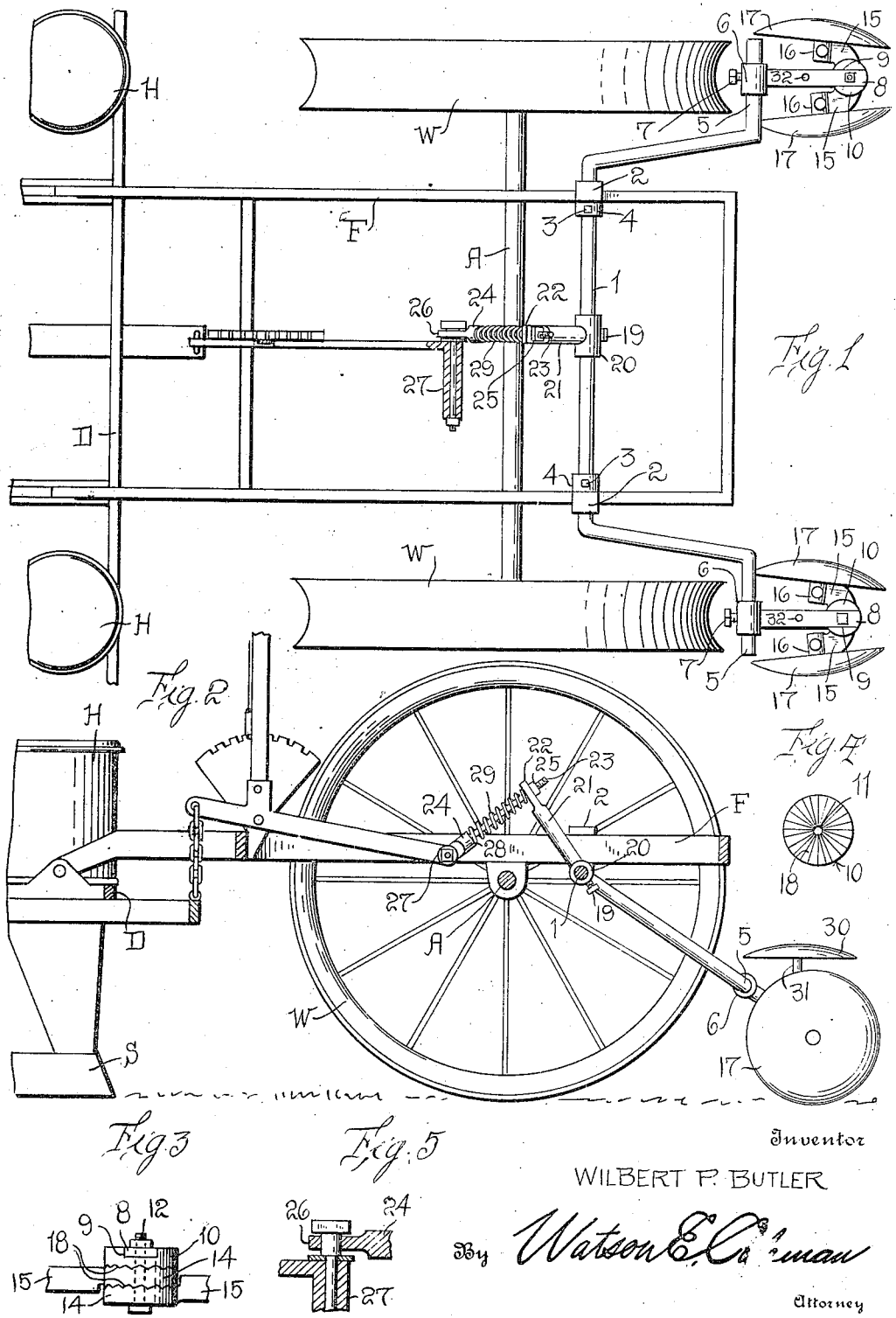

WILBERT F. BUTLER, OF DENTON, MARYLAND.

RIDGER.

1,252,658.

Specification of Letters Patent.

Patented Jan. 8, 1918.

Application filed May 26, 1917. Serial No. 171,222.

*To all whom it may concern:*

Be it known that I, WILBERT P. BUTLER, citizen of the United States, residing at Denton, in the county of Caroline and State of Maryland, have invented certain new and useful Improvements in Ridgers, of which the following is a specification, reference being had to the accompanying drawings.

This invention relates to certain improvements in ridgers, and it is an object of the invention to provide a novel and improved device of this general character which may be readily and conveniently attached to the frame of a corn planter or the like, and which operates to form a ridge rearwardly of each of the supporting wheels of a corn planter or the like.

It is also an object of the invention to provide a ridger which is supported for swinging movement in a vertical direction and which is adapted to be operatively engaged with a lifting lever or mechanism for planter shoes, so that the ridger will be raised or lowered substantially in unison with the corresponding movement of the runners.

The invention consists in the details of construction and in the combination and arrangement of the several parts of my improved ridger whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings; wherein—

Figure 1 is a view partly in top plan and partly in section, illustrating a ridger constructed in accordance with an embodiment of my invention and in applied position, parts of the corn planter being omitted for the purpose of clarity in disclosure;

Fig. 2 is a view partly in side elevation and partly in section, illustrating certain details of construction of my improved ridger as herein disclosed, the coacting corn planter being illustrated in fragment;

Fig. 3 is an enlarged fragmentary view in plan, illustrating the connection between a shank and the disk bearings coacting therewith;

Fig. 4 is a view in elevation of a locking member as herein employed in the connections between the disk bearings and the shank; and Fig. 5 is a fragmentary view partly in elevation and partly in section illustrating the operative connection between the foot lever and the member 24, as herein embodied.

As disclosed in the accompanying drawings; F denotes a frame of a corn planter of a conventional type and which is operatively engaged with an axle A, and mounted upon the axle A are the supporting wheels W. D denotes the draft or runner frame pivotally engaged with the forward portion of the frame F in a convenient manner, and which has depending therefrom in requisite relation to each of the hoppers H a runner S.

Disposed transversely of the frame F adjacent the rear end thereof is an arched axle 1, held to the frame F for rocking movement through the medium of clamping members 2 of any desired type. The intermediate portion of the axle 1 has also fixed thereto through the medium of set screws 3 or the like, the collars 4 contacting with the members 2 for holding the axle 1 against longitudinal movement.

The arched axle 1 has its opposite end portions disposed rearwardly of the wheels W and intersecting the lines of travel thereof. Mounted upon each end portion 5 of the axle 1 is a sleeve or collar 6, held in desired position on said end portion 5 through the medium of set screw 7 or the like. Depending from the sleeve 6 and preferably integrally formed therewith is a flattened shank 8 of predetermined length, which has its lower or free end portion seated within a radial slot 9 formed in the outer face of a disk 10. The axial center of the disk 10 is provided with an opening 11 through which is directed a clamping bolt 12 also directed through the axial center of the flattened heads 14 arranged at the inner extremities of the arcuate arms 15. The outer extremities of the arms 15 are provided with transversely disposed bearings 16 affording a mounting for the disks 17.

The opposed faces of the heads 14 and the disk 10 are provided with radial teeth 18 adapted to interlock, whereby it will be perceived that the arms 15 may be effectively held at their various relative adjustments. It will also be noted, as illustrated in Fig. 1 of the accompanying drawings, that the arms 15 are oppositely directed, so that as the planter or the like advances the disks 17 will work the ground in such a manner as to produce a ridge rearwardly of the supporting wheels W, said ridges being for a purpose which is believed to be clearly apparent to those skilled in the art to which my invention appertains. It will also be self-evident that the sleeves 6 permit an adjustment of the shank 8 longitudinally of the end portions 5 of the axle 1, or a radial adjustment of the shanks 8.

The axle 1, at a point intermediate of the sides of the frame F has affixed thereto through the medium of a set screw 19 or the like a sleeve 20 provided with a forwardly directed arm 21, having its free end portion flattened as at 22. Loosely disposed through the flattened portion 22 of the arm 21 is the reduced portion 23 of the vertically disposed member 24. The upper extremity of the reduced portion 23 has engaged therewith the nut or bur 25, adapted to coact with the upper surface or flattened portion of the arm 21. The lower end portion of the member 24 is pivotally engaged, as indicated at 26, with a foot lever 27. The foot lever 27 as herein disclosed is operatively engaged with the draft or runner frame D for the purpose of raising the runners or shoes S when required.

Interposed between the flattened portion 22 of the frame 21 and the shoulder 28 of the arm 24 as afforded by the reduced portion 23, is the expansible member 29, herein disclosed as a conventional coil spring encircling the reduced portion 23. The spring 23 serves to normally maintain the end portion 22 of the arm 21 and the stop as afforded by the nut or bur 25, constantly in contact, although permitting a rocking movement of the frame D independently of the axle 1. It will also be understood that when the foot lever 27 is depressed to elevate the shoes or runners S, the axle 1 will be so rocked as to elevate the disks 17.

In the event the planter should be of a wire check row type I find it of advantage to arrange above each pair of disks 17 a shield 30, as illustrated in Fig. 2 of the accompanying drawings. The shield 30 serves to prevent the wire from becoming entangled with the disks 17 at the end of a row. As herein embodied each of the shields 30 is provided at its center with a depending stem 31, adapted to be seated within a suitable socket 32 produced in the upper face of the adjacent shank 8.

From the foregoing description, it is thought to be obvious that a ridger constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. An attachment for a corn planter having a shoe lifting lever comprising an arched axle adapted to be rotatably engaged with the frame of the planter, ground engaging elements mounted upon the terminals of the axle, a rock arm carried by the intermediate portion of the axle, a member adapted to be pivotally engaged with the shoe lifting lever and loosely disposed through the free end portion of the arm of the axle, a stop carried by the outer end portion of said member adapted to contact with the arm, and yielding means for maintaining the stop of the member normally in contact with the arm.

2. An attachment for a corn planter having a shoe lifting lever comprising an arched axle adapted to be rotatably engaged with the frame of the planter, ground engaging elements mounted upon the terminals of the axle, a rock arm carried by the intermediate portion of the axle, means for connecting said rock arm with the shoe lifting lever, and shields positioned above the ground engaging members.

3. An attachment for a corn planter comprising a shoe lifting lever, an arched axle adapted to be rotatably engaged with the frame of the planter, ground engaging elements mounted upon the terminals of the axle, a rock arm carried by the intermediate portion of the axle, a member pivotally engaged with the shoe lifting lever and loosely disposed through the free end portion of the arm of the axle, a stop carried by the outer end portion of said member adapted to contact with the arm, yielding means for maintaining the stop of the member normally in contact with the arm, the portion of the shoe lifting lever adjacent its pivotal connection with the arm being provided with a pedal.

In testimony whereof I hereunto affix my signature in the presence of two witnesses.

WILBERT P. BUTLER.

Witnesses:
Wm. H. Anderson,
Geo. A. Deakyne.